United States Patent
Huang et al.

(10) Patent No.: US 9,442,529 B2
(45) Date of Patent: Sep. 13, 2016

(54) ELECTRONIC DEVICE WITH A FOLD MODE AND AN UNFOLD MODE

(71) Applicant: Wistron Corporation, New Taipei (TW)

(72) Inventors: Hao-Chien Huang, New Taipei (TW); Yi-Kai Wang, New Taipei (TW); Chia-Han Chen, New Taipei (TW); Chun-Yu Lin, New Taipei (TW); Hsin-Yu Hsieh, New Taipei (TW)

(73) Assignee: Wistron Corporation, New Taipei (TW)

( * ) Notice: Subject to any disclaimer, the term of this patent is extended or adjusted under 35 U.S.C. 154(b) by 65 days.

(21) Appl. No.: 14/547,141

(22) Filed: Nov. 19, 2014

(65) Prior Publication Data
US 2015/0234433 A1 Aug. 20, 2015

(30) Foreign Application Priority Data

Feb. 19, 2014 (TW) .............................. 103105552 A

(51) Int. Cl.
*G06F 1/16* (2006.01)
(52) U.S. Cl.
CPC ........... *G06F 1/1652* (2013.01); *G06F 1/1618* (2013.01); *G06F 1/1681* (2013.01)
(58) Field of Classification Search
CPC .. G06F 1/1652; G06F 1/1616; G06F 1/1618; G06F 1/1681; H04M 1/0216; H04M 1/0268; H05K 1/028; H05K 5/0017; H05K 5/0021; H05K 5/0226
USPC ............ 361/679.01, 679.02, 679.04–679.09, 361/679.26–679.3, 679.55, 679.5, 679.59; 345/156, 157, 168, 169; 455/575.1–575.9
See application file for complete search history.

(56) References Cited

U.S. PATENT DOCUMENTS

| | | | |
|---|---|---|---|
| 8,228,667 B2 | 7/2012 | Ma | |
| 8,385,055 B2 | 2/2013 | Kao | |
| 8,727,601 B2* | 5/2014 | Wang | G09F 9/30 361/679.01 |
| 2004/0052044 A1* | 3/2004 | Mochizuki | G06F 1/1616 361/679.15 |
| 2006/0050169 A1* | 3/2006 | Misawa | G06F 1/1616 348/333.06 |
| 2006/0146488 A1* | 7/2006 | Kimmel | G06F 1/1616 361/679.04 |
| 2011/0286157 A1* | 11/2011 | Ma | G06F 1/1652 361/679.01 |
| 2012/0243206 A1* | 9/2012 | Wang | G09F 9/30 362/97.1 |
| 2014/0125553 A1* | 5/2014 | Kim | G06F 1/1616 345/1.3 |
| 2014/0355195 A1* | 12/2014 | Kee | G06F 1/1616 361/679.27 |

FOREIGN PATENT DOCUMENTS

CN 1744803 A 3/2006

OTHER PUBLICATIONS

Office action mailed on Sep. 8, 2015 for the Taiwan application No. 103105552, filing date: Feb. 19, 2014, p. 1 line 13-14, p. 2-3 and p. 4 line 1-4.

* cited by examiner

*Primary Examiner* — Courtney Smith
*Assistant Examiner* — Sagar Shrestha
(74) *Attorney, Agent, or Firm* — Winston Hsu; Scott Margo

(57) ABSTRACT

An electronic device with a fold mode and an unfold mode includes a display module and an input module. The display module includes a first connecting component, a second connecting component and a flexible displaying panel. The second connecting component rotates relative to the first connecting component via a first direction to form as the fold mode or the unfold mode. The flexible displaying panel is disposed on the first connecting component and the second connecting component. The flexible displaying panel is bent to be U-shaped when the display module is formed as the fold mode. The flexible displaying panel is flat when the display module is formed as the unfold mode, and a planar normal vector points toward a second direction. The input module is rotatably connected to the display module via a third direction.

23 Claims, 16 Drawing Sheets

ELECTRONIC DEVICE WITH A FOLD MODE AND AN UNFOLD MODE

BACKGROUND OF THE INVENTION

1. Field of the Invention

The present invention relates to an electronic device having a flexible displaying panel, and more particularly, to an electronic device having the flexible displaying panel and capable of being arbitrarily in a folded mode and to an unfolded mode.

2. Description of the Prior Art

Most of the available electronic reading devices utilize the conventional liquid crystal display to be the hard panel display. With advanced technology of the flexible displaying panel (such as the E-paper), the electronic reading device with the flexible displaying panel, which can be folded and unfolded, becomes trend of consumer's electronic product market. The conventional flexible panel utilizes a flex mechanism to reduce volume of the electronic reading device and overcome drawback of the flexible displaying panel unaligned with its supporter when the electronic reading device is unfolded. However, the conventional flex mechanism cannot provide effective support to the flexible displaying panel when the electronic reading device is unfolded, and the flexible displaying panel is damaged easily by unexpected pressure. Thus, design of a flex mechanism with a fold mode and an unfold mode and capable of applying preferred support to the flat flexible displaying panel and an electronic device with the foresaid flex mechanism is an important issue of machinery design industry.

SUMMARY OF THE INVENTION

The present invention provides an electronic device having the flexible displaying panel and capable of being arbitrarily in a folded mode and to an unfolded mode for solving above drawbacks.

According to the claimed invention, an electronic device with a fold mode and an unfold mode is disclosed. The electronic device includes a display module and an input module rotatably connected to the display module. The display module includes a first connecting component, a second connecting component and a flexible displaying panel. The second connecting component is connected to the first connecting component. The second connecting component is adapted to axially rotate at a first direction so as to switch the display module to the fold mode or the unfold mode. Two opposite sides of the flexible displaying panel are respectively disposed on the first connecting component and the second connecting component. The flexible displaying panel is bent to be a U-shaped form when the display module is in the fold mode. The flexible displaying panel is flat and a planar normal vector of the flexible displaying panel points toward a second direction when the display module is in the unfold mode. The second direction is substantially perpendicular to the first direction. The input module can axially rotate at a third direction, and the third direction is substantially perpendicular to the first direction and the second direction.

According to the claimed invention, the display module further includes a base and a bridging component. The base is movably disposed on the bridging component. The first connecting component and the second connecting component are respectively pivoted to opposite sides of the base.

According to the claimed invention, the base is rotatably disposed on the bridging component and capable of axially rotating at the second direction. The input module pivots to a bottom of the bridging component opposite to the base.

According to the claimed invention, the base is rotatably and movably disposed on the bridging component. The input module pivots to a top of the bridging component adjacent to the base.

According to the claimed invention, the display module further includes a guiding component disposed on a bottom of the base. The bridging component includes a rotary mechanism. The rotary mechanism includes a rotating component and a constraining component. The rotating component is rotatably disposed on an inner side of the constraining component, and the guiding component is detachably connected to the rotating component.

According to the claimed invention, an engaging slot is formed on the rotating component, and the guiding component is engaged with the engaging slot.

According to the claimed invention, the bridging component further includes a guiding slot structure. The rotary mechanism is disposed on an end of the guiding slot structure, and the guiding component is slidably disposed inside the guiding slot structure.

According to the claimed invention, the guiding component includes a moving portion and a pin, and an end of the pin is connected to the moving portion.

According to the claimed invention, the pin is a hollow structure wherethrough a signal transmission cable pierces. The guiding component utilizes the moving portion to move relative to the guiding slot structure.

According to the claimed invention, the moving portion is a roller mechanism or a gear mechanism.

According to the claimed invention, the rotary mechanism further includes at least one resilient component disposed on the rotating component. The resilient component drives a first wedging portion of the rotating component to wedge with a second wedging portion of the constraining component.

According to the claimed invention, the rotary mechanism further includes at least one resilient component disposed on the constraining component. The resilient component drives a second wedging portion of the constraining component to wedge with a first wedging portion of the rotating component.

According to the claimed invention, the input module includes a body and an input unit. The input unit is rotatably connected to the body, and the body is utilized to accommodate at least one electronic component.

According to the claimed invention, the input module rotates relative to the display module to switch to a storage mode or an operation mode. The input unit faces a displaying surface of the display module when the input module is in the storage mode. The input unit moves away from the displaying surface to be parallel to the display module when the input module is in the operation mode.

According to the claimed invention, a first protruding portion stretches from the first connecting component, and a second protruding portion stretches from the second connecting component. An end of the first protruding portion is connected to the first connecting component, an end of the second protruding portion is connected to the second connecting component, and the other end of the first protruding portion pivots to the other end of the second protruding portion.

According to the claimed invention, the electronic device includes a joint module disposed between the display module and the input module. The joint module includes a revolving component engaged with the input module to rotate the input module relative to the display module at the third direction.

According to the claimed invention, the joint module further includes an axle component. The revolving component is disposed on an end of the axle component. The input module is movably disposed on the axle component to move relative to the display module along an axial direction of the axle component.

According to the claimed invention, the joint module further includes a sensor disposed on the revolving component. The sensor is actuated by the input module to establish electric connection between the input module and the display module.

According to the claimed invention, the display module further includes a first magnet and a second magnet respectively disposed on the first protruding portion and the second protruding portion in a magnetic repulsion manner.

According to the claimed invention, the display module further includes a contacting component disposed on the first connecting component. The contacting component contacts against the first connecting component and the second connecting component when the display module is in the fold mode.

According to the claimed invention, the display module further includes an actuating component electrically connected to the contacting component and the input module. The actuating component moves the contacting component relative to the first connecting component according to rotation of the input module.

According to the claimed invention, a first magnetic component is disposed on an end of the first connecting component adjacent to the second connecting component, and a second magnetic component is disposed on an end of the second connecting component adjacent to the first connecting component. The first magnetic component aligns with the second magnetic component in a magnetic attraction manner when the display module is in the unfold mode.

The electronic device of the present invention provides the preferred level support to the flexible displaying panel, and the flexible displaying panel can show flat surface when the display module is in the unfold mode. In addition, the electronic device utilizes rotary axles at the first direction, the second direction and the third direction to switch the display module between the fold mode and the unfold mode, and to switch the input module between the storage mode and the operation mode. The input module and the display module of the present invention can be stacked up to minimize configuration of the electronic device. Comparing to the prior art, the present invention has advantages of preferred level support and convenient storage function, modes of the display module and the input module can be arbitrarily switched according to user's demand.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
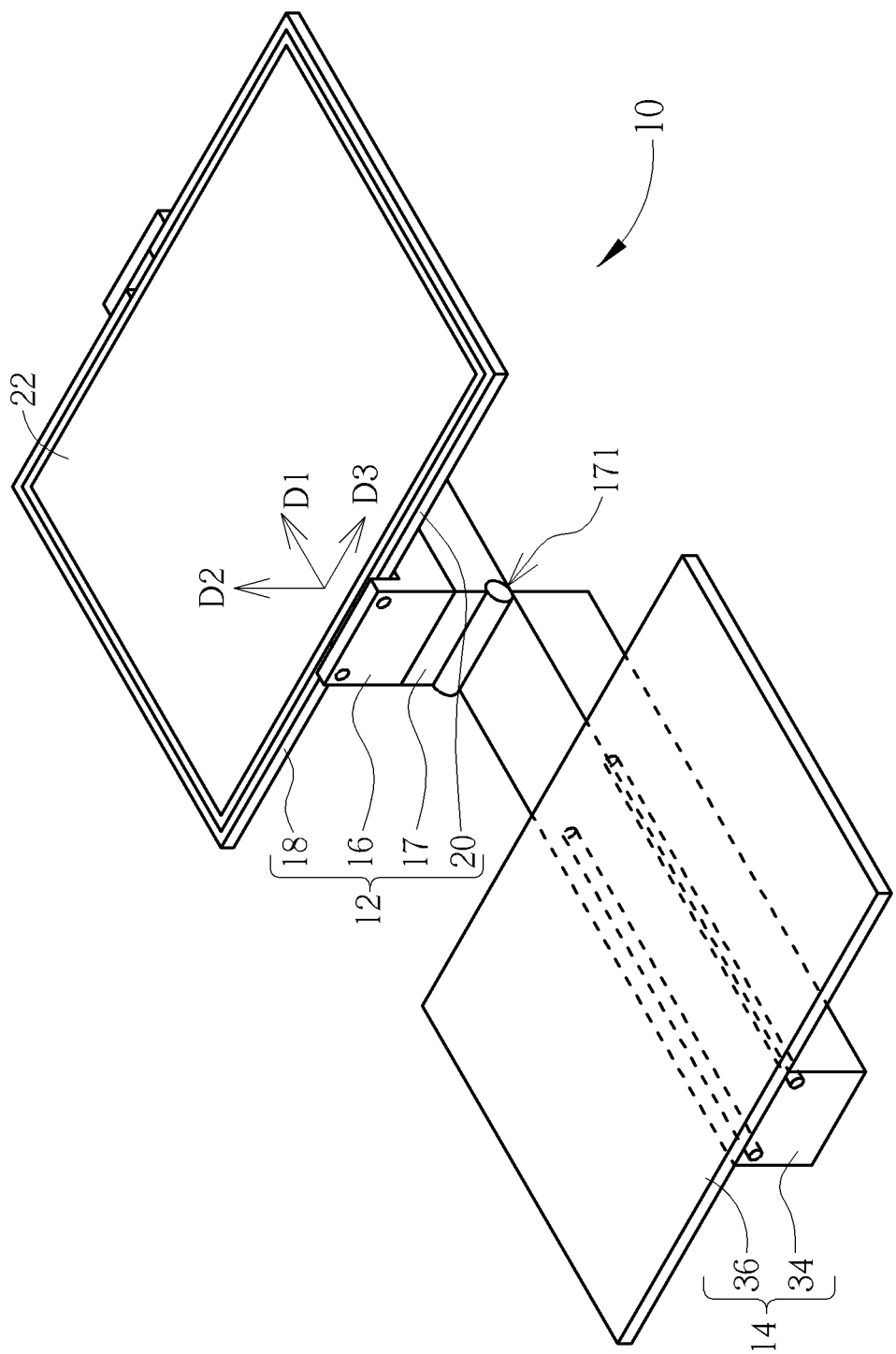
FIG. 1 and FIG. 2 respectively are diagrams of an electronic device in different modes according to a first embodiment of the present invention.
Figure 2:
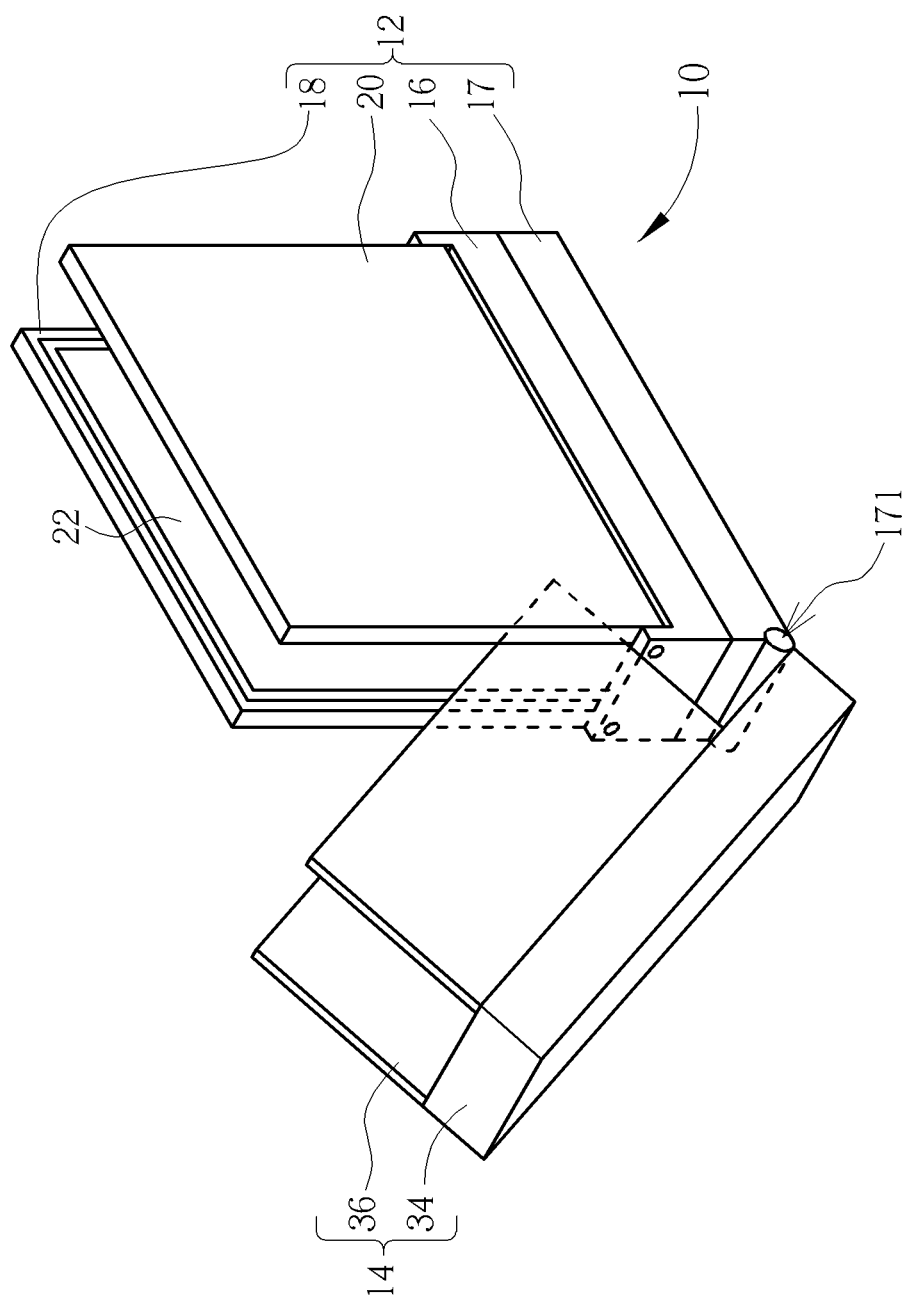

Please refer to FIG. 1 and FIG. 2. FIG. 1 and FIG. 2 respectively are diagrams of an electronic device 10 in different modes according to a first embodiment of the present invention. The electronic device 10 includes a display module 12 and an input module 14. The input module 14 can rotate relative to the display module 12 to vary external form of the electronic device 10, which can be switched between a fold mode and an unfold mode. The display module 12 includes a base 16, a bridging component 17, a first connecting component 18 and a second connecting component 20. The base 16 is movably disposed on the bridging component 17. The first connecting component 18 and the second connecting component 20 respectively pivot to opposite sides of the base 16, which means the second connecting component 20 is rotatably connected to the first connecting component 16 via the base 16. The display module 12 further includes a flexible displaying panel 22. Opposite sides of the flexible displaying panel 22 are respectively disposed on the first connecting component 18 and the second connecting component 20. The second connecting component 20 can axially rotate relative to the first connecting component 18 at a first direction D1, and the display module 12 can be in the fold mode (as shown in FIG. 2) or the unfold mode (as shown in FIG. 1).

As shown in FIG. 1, the display module 12 is in the unfold mode, the flexible displaying panel 22 spreads out over the first connecting component 18 and the second connecting component 20 for flat viewing. A planar normal vector V of the flexible displaying panel 22 points toward (be parallel to) the second direction D2, and the second direction D2 is substantially perpendicular to the first direction D1. As shown in FIG. 2, the display module 12 is in the fold mode, and the flexible displaying panel 22 is bent to be a U-shaped form by rotation of the connecting components 18, 20, so as to minimize a configuration of the display module 12. In addition, the input module 14 is rotatably connected to the display module 12 and capable of axially rotating at a third direction D3. The third direction D3 is substantially perpendicular to the first direction D1 and the second direction D2. The input module 14 shown in FIG. 1 is in an operation mode, a user can simultaneously watch information performed on the display module 12 and input a control command by the input module 14. The input module 14 shown in FIG. 2 is in a storage mode, the input module 14 rotatably moves to a position between the connecting components 18, 20 of the display module 12, so as to minimize the configuration of the electronic device 10 for easy collection.

In the first embodiment, the base 16 is rotatably disposed on the bridging component 17, which means the base 16 disposed on the bridging component 17 can axially rotate at the second direction D2, and the input module 14 pivots to a bottom 171 of the bridging component 17 opposite to the base 16. As the input module 14 is in the operation mode, a height difference exists between an input interface of the input module 14 and the flexible displaying panel 22 (or the connecting components 18, 20). The base 16 does not contact the input module 14 to prevent structural interference when the base 16 axially rotate relative to the bridging component 17 at the second direction D2.

Figure 3:
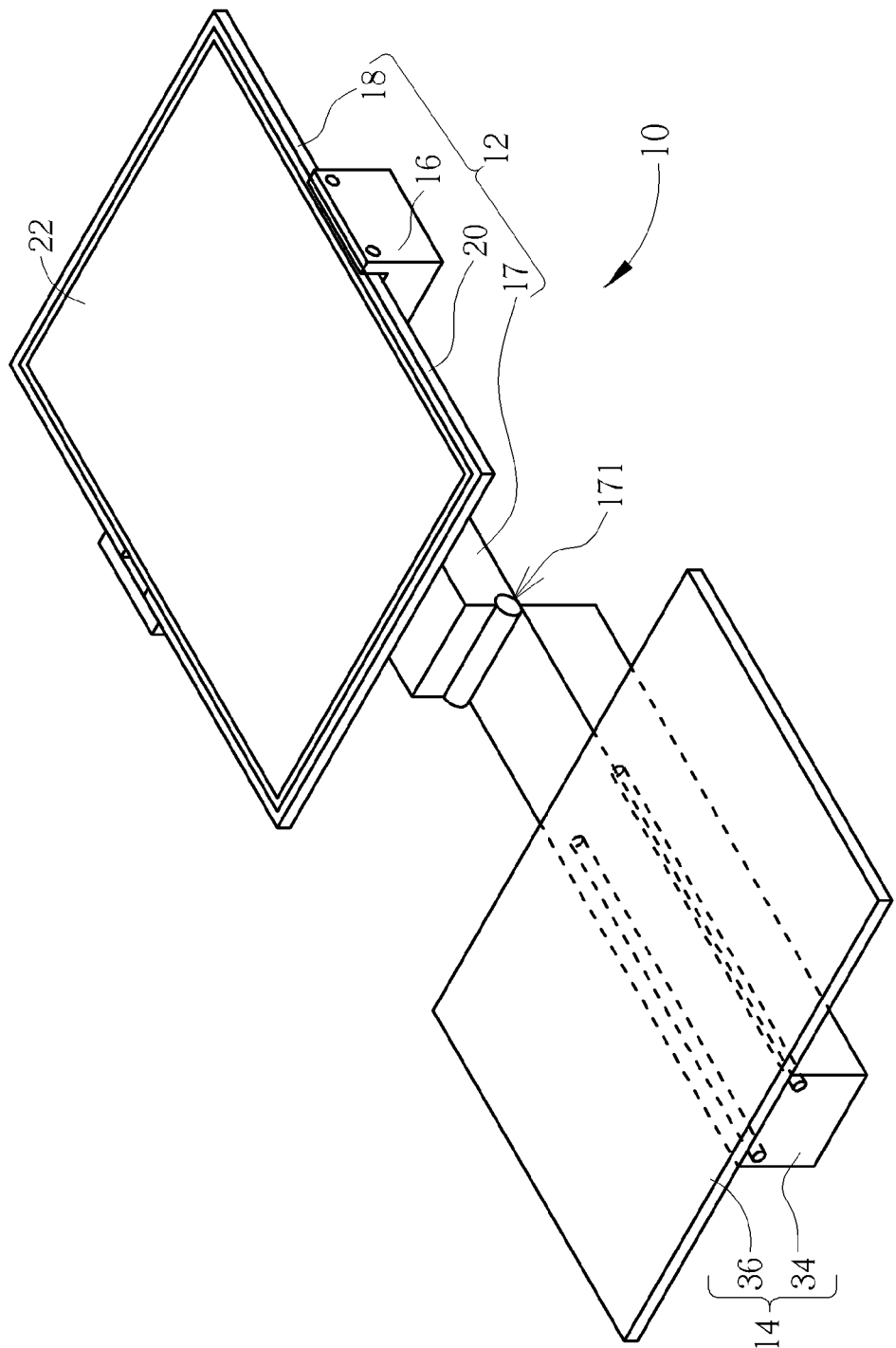
FIG. 3 is a diagram of the electronic device in another mode according to the first embodiment of the present invention.
Figure 4:
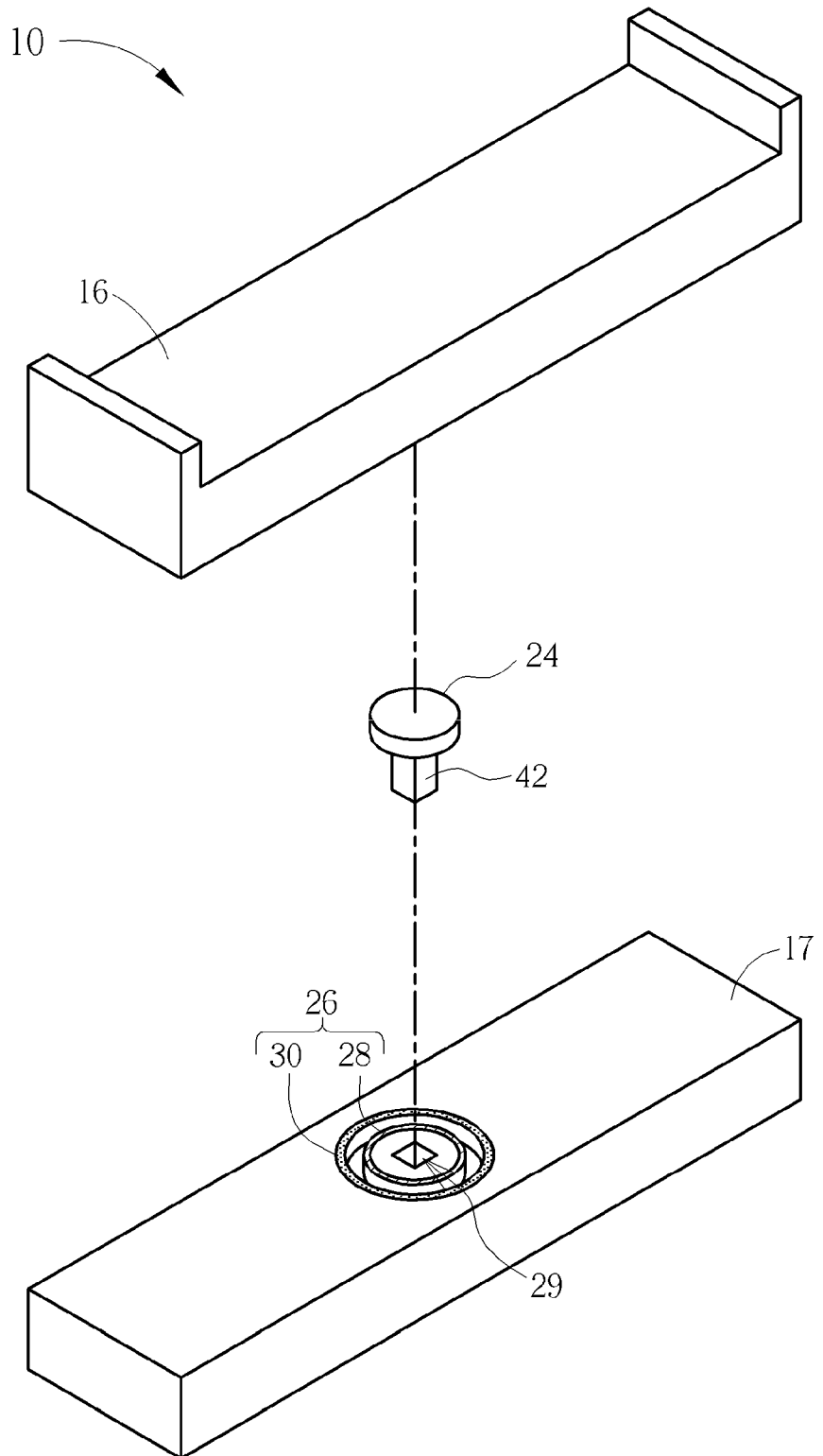
FIG. 4 is a partial structural diagram of the electronic device according to the first embodiment of the present invention.

Please refer to FIG. 3 and FIG. 4. FIG. 3 is a diagram of the electronic device 10 in another mode according to the first embodiment of the present invention. FIG. 4 is a partial structural diagram of the electronic device 10 according to the first embodiment of the present invention. The base 16 rotates to 90 degrees from position shown in FIG. 2 to position shown in FIG. 3 (at a clockwise direction or a counterclockwise direction), which results in an adjustment of a visual angle of the flexible displaying panel 22. The display module 12 further includes a guiding component 24 disposed on a bottom of the base 16. The bridging component 17 includes a rotary mechanism 26, which includes a rotating component 28 (such as an oblique line area shown in FIG. 4) and a constraining component 30 (such as a dotted area shown in FIG. 4). The rotating component 28 is rotatably disposed on an inner side of the constraining component 30. The guiding component 24 is detachably connected to the rotating component 28. A pin 42 of the guiding component 24 inserts into an engaging slot 29 on the rotating component 28, the pin 42 is not separated from the engaging slot 29, and the guiding component 24 can stably rotate relative to the rotating component 28.

A shape of the pin 42 corresponds to a shape of the engaging slot 29 for easy disassembly and assembly because the guiding component 24 is detachably fixed to the rotating component 28. The guiding component 24 rotates the rotating component 28 relative to the constraining component 30 when the base 16 is rotated, and the rotating component 28 is assembled with the constraining component 30 via appropriate wedging portions according to an angle of rotation, so as to adjust relative position between the base 16 and the bridging component 17.

Figure 5:
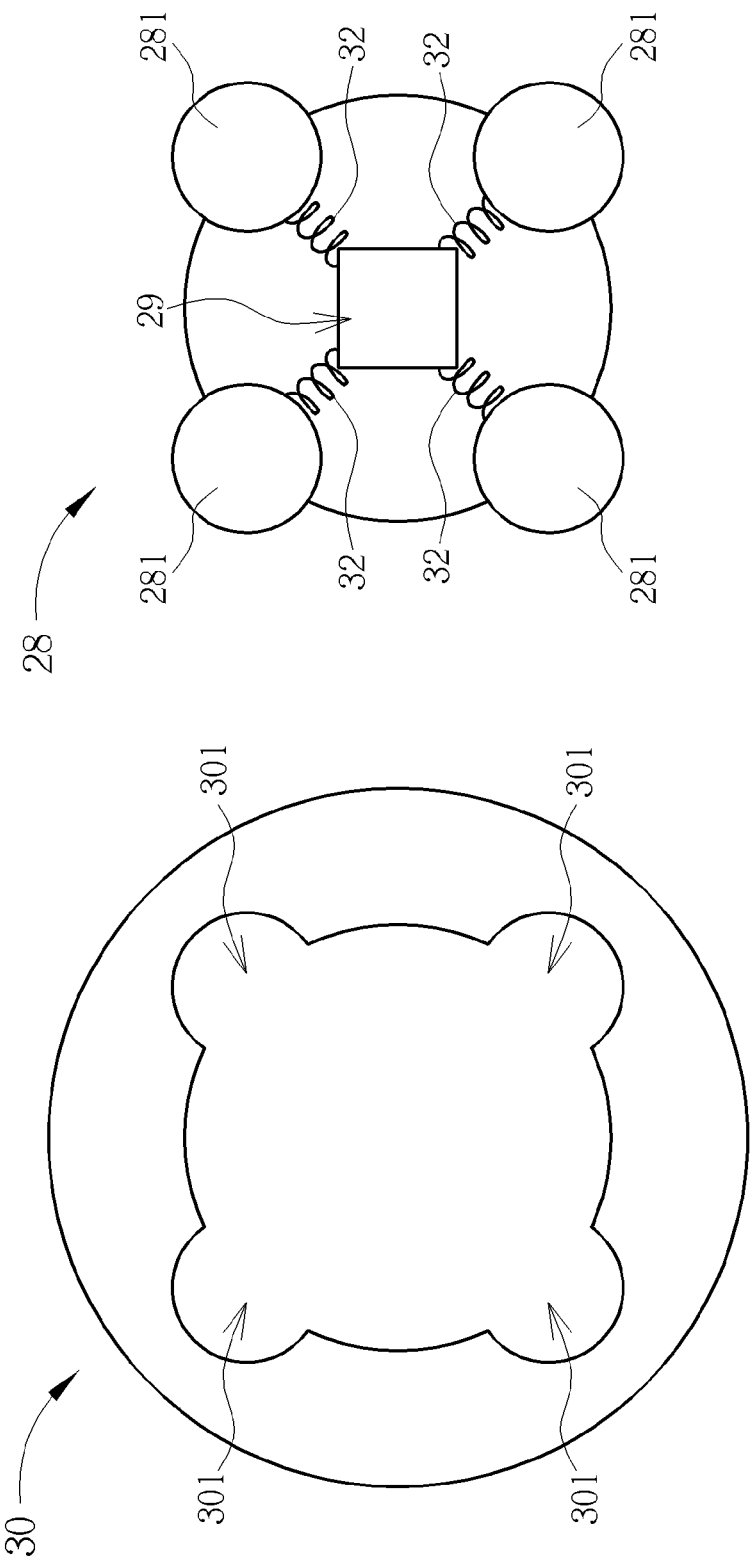
FIG. 5 and FIG. 6 respectively are diagrams of a rotary mechanism according to different embodiments of the present invention.
Figure 6:
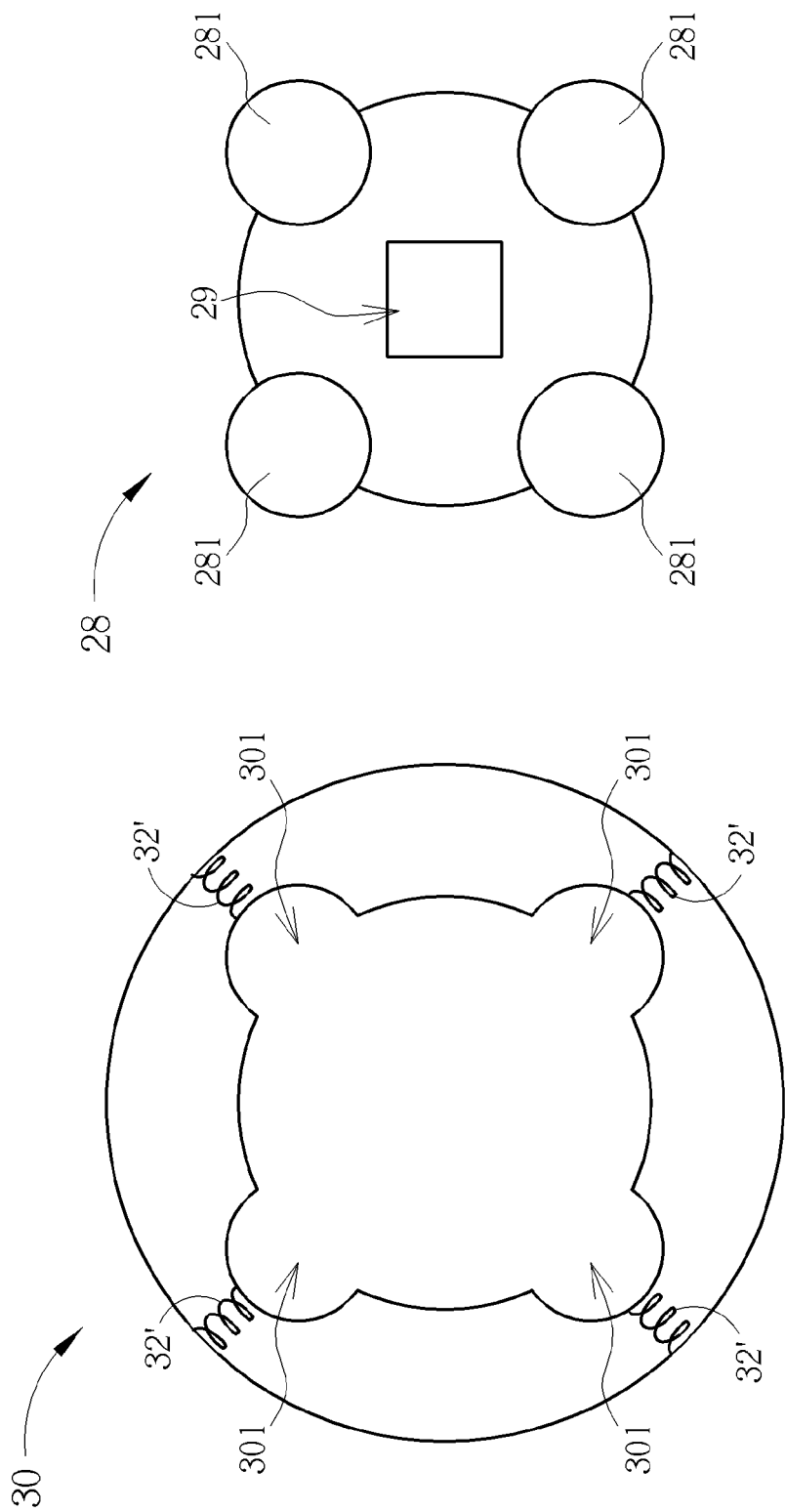

Please refer to FIG. 5 and FIG. 6. FIG. 5 and FIG. 6 respectively are diagrams of the rotary mechanism 26 according to different embodiments of the present invention. The rotating component 28 includes at least one first wedging portion 281, and the constraining component 30 includes a plurality of second wedging portions 301. The first wedging portion 281 and the second wedging portion 310 respectively can be a protrusion and an indentation matched with each other. A shape of the first wedging portion 281 corresponds to a shape of the second wedging portion 301. As shown in FIG. 5, the rotary mechanism 26 further includes at least one resilient component 32 disposed on the rotating component 28. Resilient recovering force of the resilient component 32 is utilized to wedge the first wedging portion 281 with the second wedging portion 301. As shown in FIG. 6, the rotary mechanism 26 further includes at least one resilient component 32' disposed on the constraining component 30. Resilient recovering force of the resilient component 32' is utilized to wedge the second wedging portion 301 with the first wedging portion 281. When the rotating component 28 rotates relative to the constraining component 30, the first wedging portion 281 is wedged with the corresponding second wedging portion 310 according to rotary angle of the base so as to constrain movement between the base 16 and the bridging component 17.

Besides, the input module 14 includes a body 34 and an input unit 36. The input unit 36 is rotatably connected to the body 34. An amount of the input unit 36 can be one or more, and there are two input units 36 with symmetric location illustrated in this embodiment. The body 34 is utilized to accommodate an electronic component, such as the processor, the memory, the hard disk and so on. The input unit 36 can be the keyboard or the touch pad, any tools capable of inputting the control command belongs to scope of the input unit. As shown in FIG. 1, the input module 14 is in the operation mode, the body 34 and the input unit 36 move away from the displaying surface of the display module 12 to be parallel to the display module 12, and a level height of the input unit 36 is lower than a level height of the flexible displaying panel 22. As shown in FIG. 2, the input module 14 is in the storage mode. The body 34 rotates at the third direction D3 to stand by the display module 12. The input unit 36 is folded relative to the body 34 to suspend over the display module 12 (for example, the input unit 36 faces the displaying surface of the display module 12), and is located between the first connecting component 18 and the second connecting component 20 which are driven to the fold mode.

Figure 7:
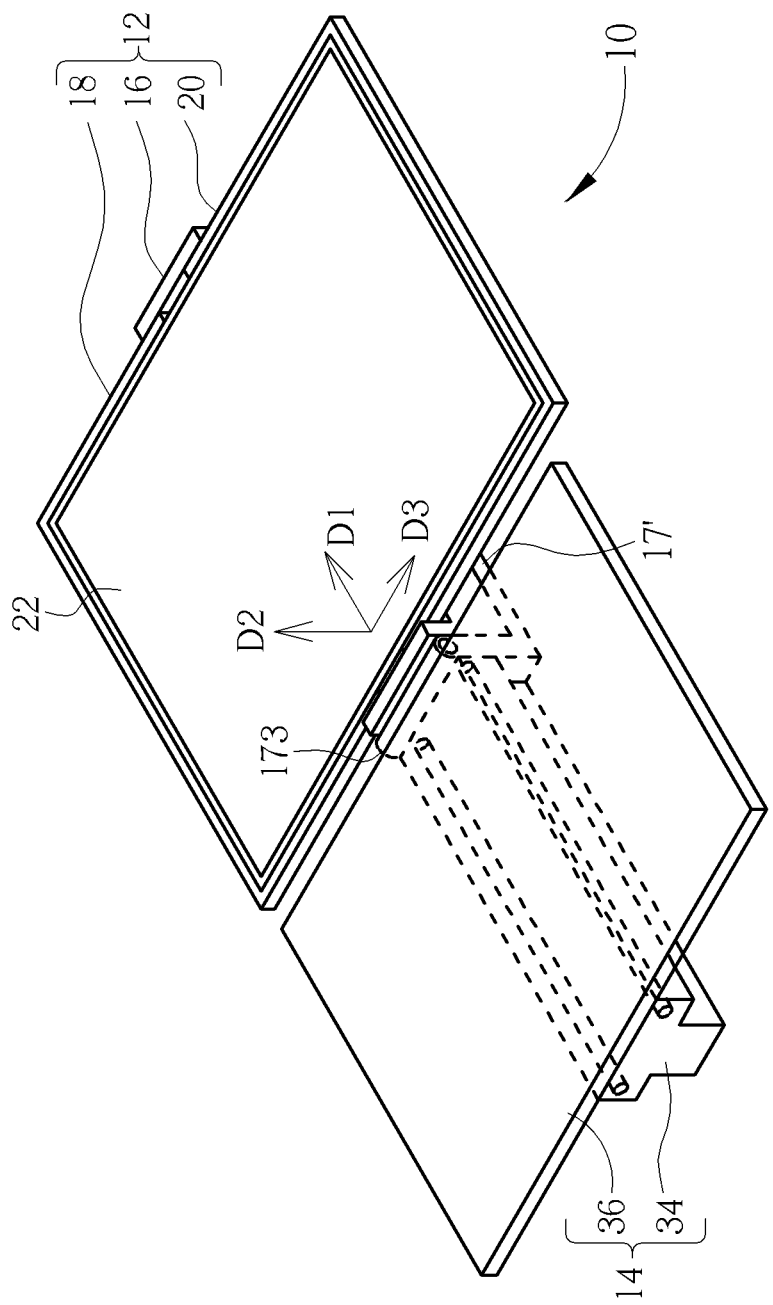
FIG. 7 to FIG. 10 respectively are diagrams of the electronic device in different modes according to a second embodiment of the present invention.
Figure 8:
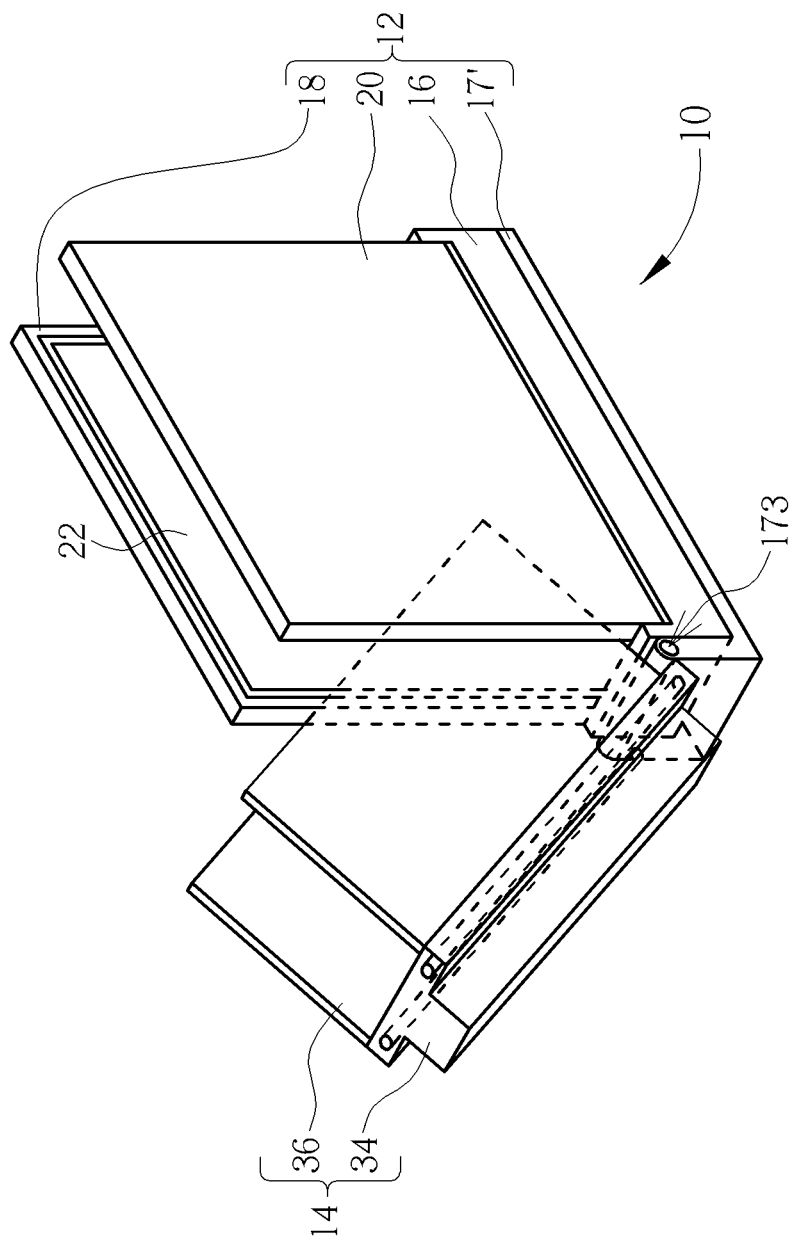

Please refer to FIG. 7 to FIG. 10. FIG. 7 to FIG. 10 respectively are diagrams of the electronic device 10 indifferent modes according to a second embodiment of the present invention. In the second embodiment, elements having the same numerals as one of the first embodiment have the same structures and functions, and a detailed description is omitted herein for simplicity. Difference between the first embodiment and the second embodiment is: the bridging component 17' is a L-shaped structure (by the lateral view), the input module 14 pivots to a top 173 of the bridging component 17' adjacent to a short edge of the base 16, and the base 16 is rotatably and movably disposed on the bridging component 17'. As shown in FIG. 7, the display module 12 is in the unfold mode, the input module 14 is in the operation mode, and the level height of the input unit 36 is substantially the same as the level height of the flexible displaying panel 22. As shown in FIG. 8, the display module 12 is in the fold mode, the input module 14 is in the storage module, the body 34 stands by the display module 12, the input unit 36 is folded to suspend over the display module 12 (such as being closed to the displaying surface of the display module 12), and is located between the first connecting component 18 and the second connecting component 20.

Figure 9:
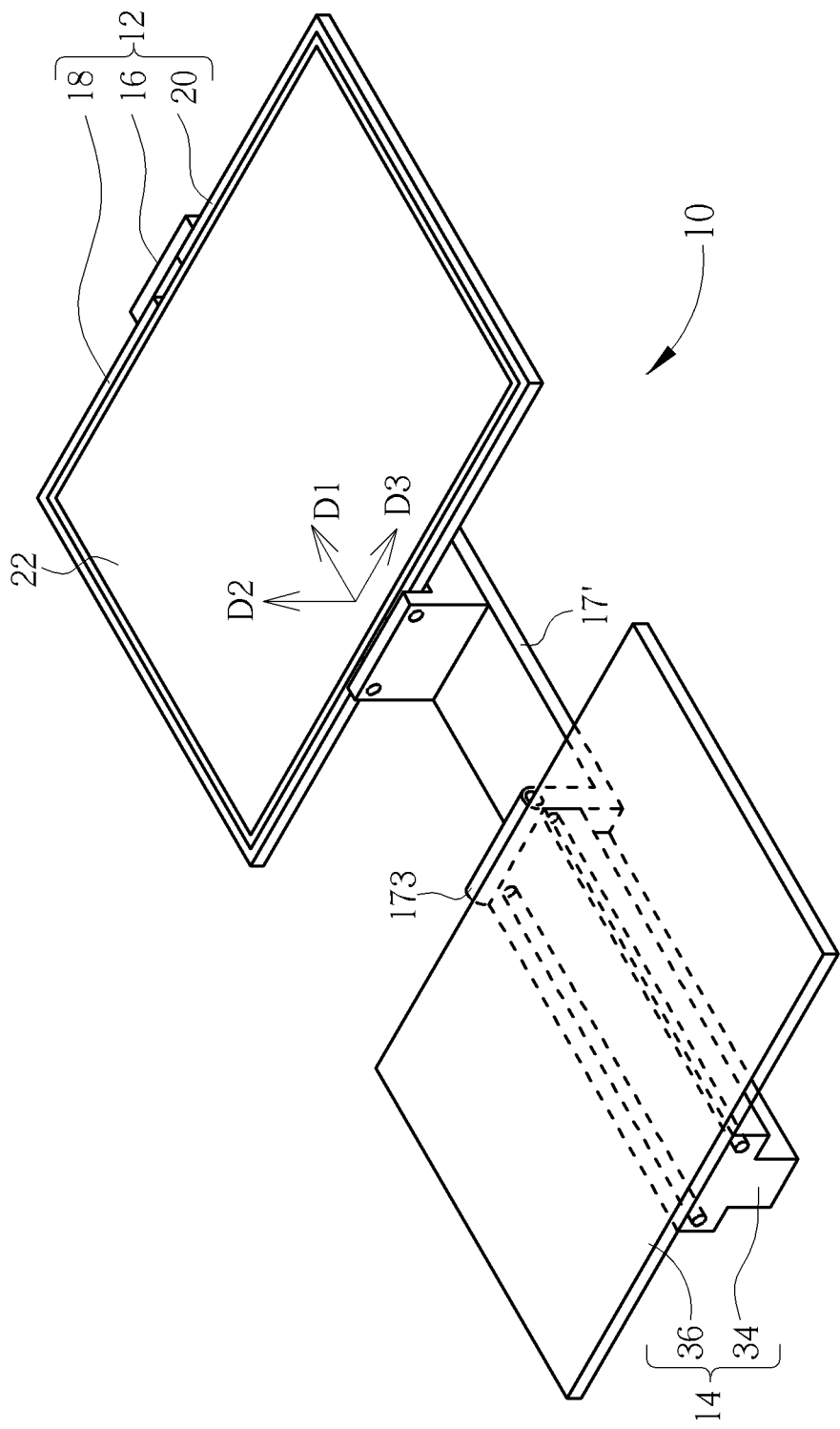
Figure 10:
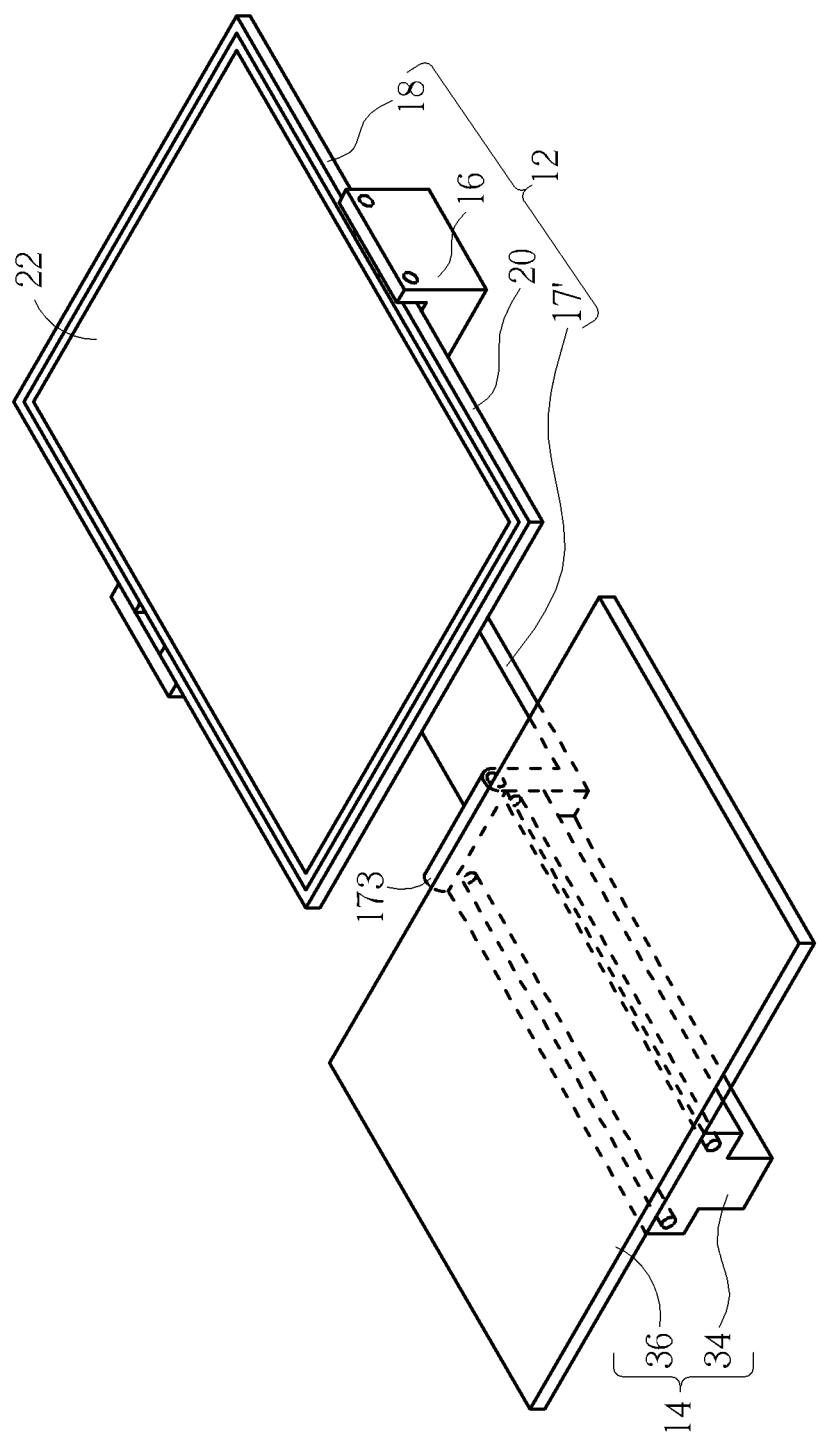

To prevent the structural interference between the display module 12 and the input module 14, the display module 12 is removed from the input module 14 to increase an interval between the modules 12, 14 before the visual angle of the flexible displaying panel 22 is adjusted, and the base 16 can arbitrarily rotate relative to the bridging component 17' without collision between the display module 12 and the input module 14. As shown in FIG. 9, the base 16 linearly moves relative to the bridging component 17' at the first direction D1. As shown in FIG. 10, the base 16 axially rotates relative to the bridging component 17' at the second direction D2 (such as the clockwise direction or the counterclockwise direction) when the display module 12 is distant from the input module 14, and the flexible displaying panel 22 is adjusted from a transverse state to a vertical state. Transformation of the flexible displaying panel 22 from the vertical state to the transverse state is reverse to the above-mentioned procedure, and a detailed description is omitted herein for simplicity.

Figure 11:
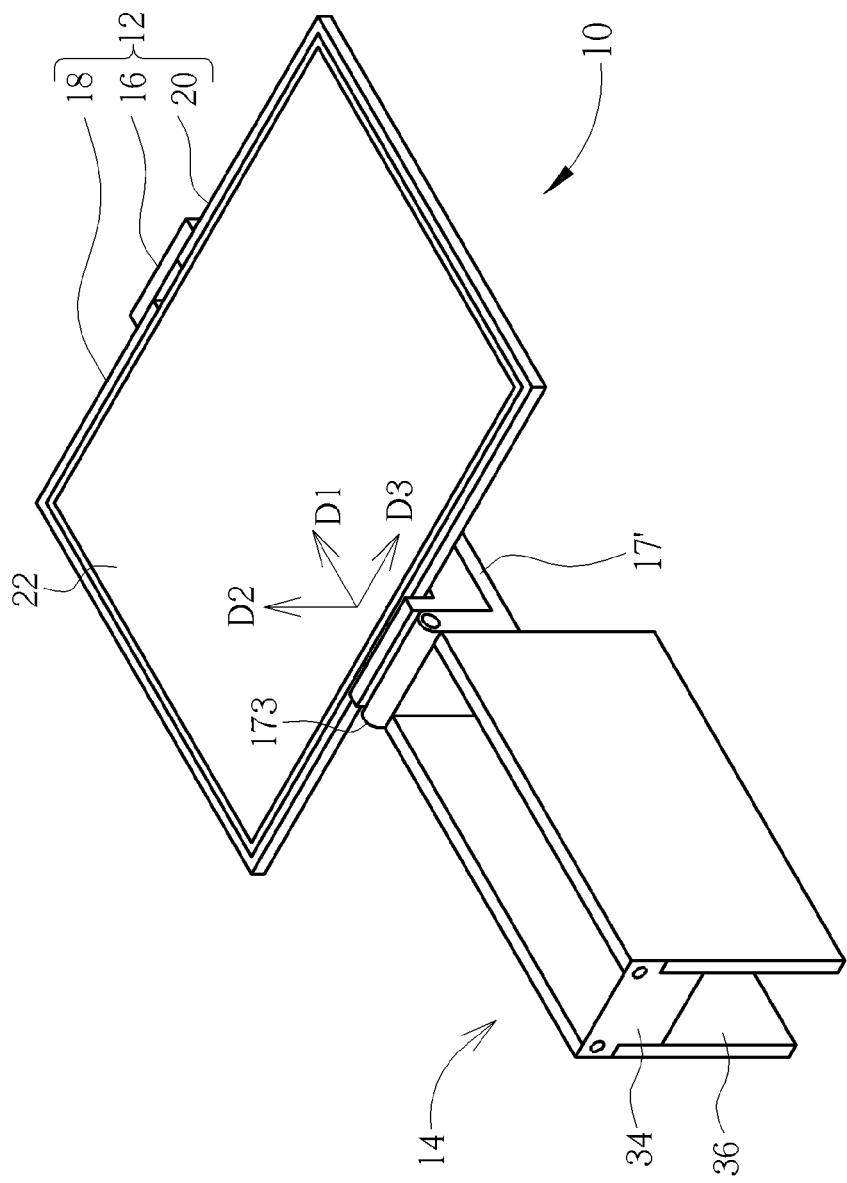
FIG. 11 is a diagram of the electronic device in another mode according to the second embodiment of the present invention.

Please refer to FIG. 11. FIG. 11 is a diagram of the electronic device 10 in another mode according to the second embodiment of the present invention. The input unit 36 not only can upwardly rotate relative to the body 34 (such as the position shown in FIG. 8), but also can downwardly rotate relative to the body 34 so as to perform the input module 14 as an inverted U-shaped form (which has a downward opening). Assembly application of the body 34 and the input unit 36 is not limited to the above-mentioned embodiment, and depends on actual demand.

Figure 12:
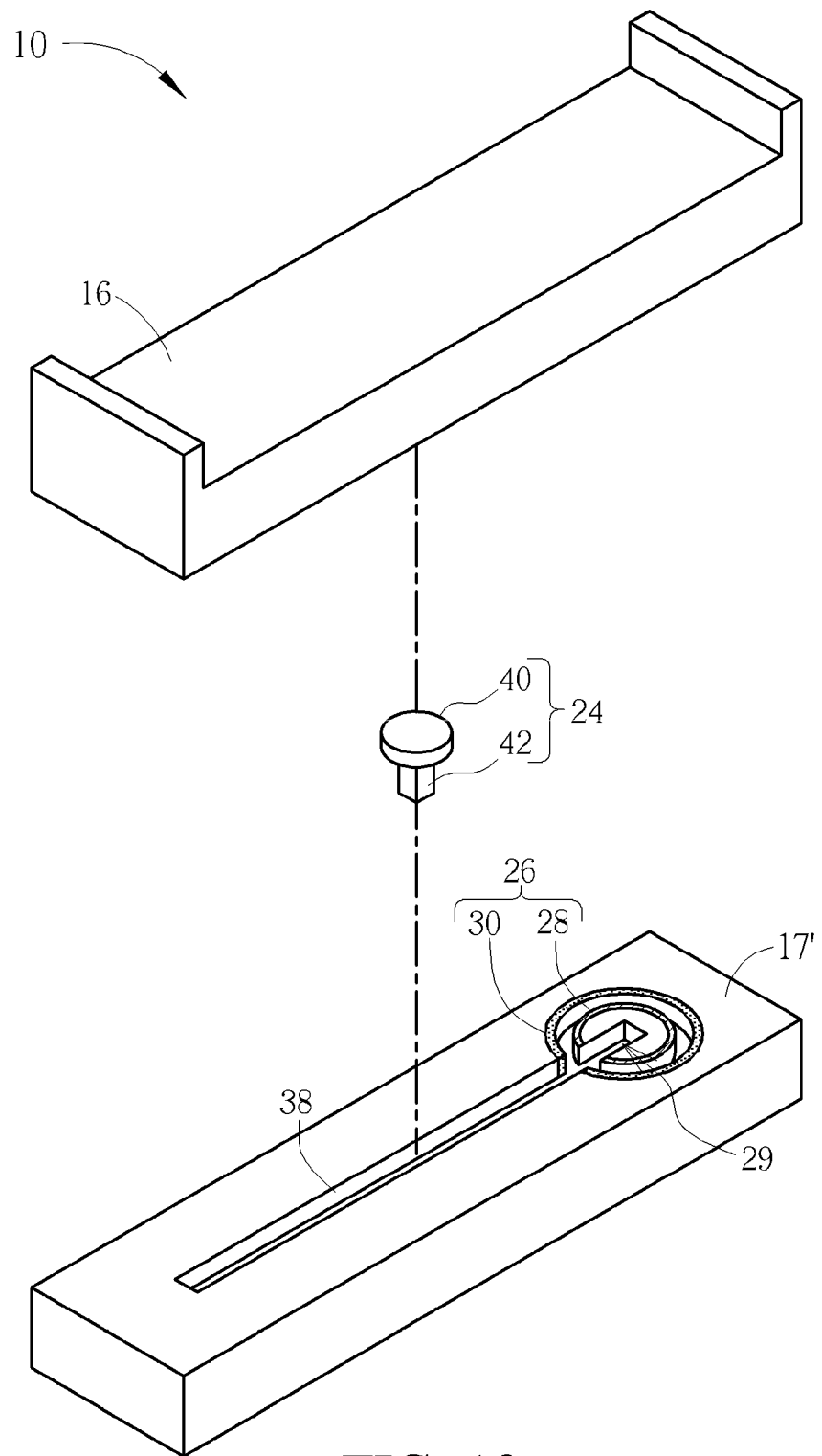
FIG. 12 is a partial structural diagram of the electronic device according to the second embodiment of the present invention.

Please refer to FIG. 12. FIG. 12 is a partial structural diagram of the electronic device 10 according to the second embodiment of the present invention. The bridging component 17' further includes a guiding slot structure 38, and the rotary mechanism 26 is disposed on an end of the guiding slot structure 38. The guiding component 24 is slidably disposed inside the guiding slot structure 38. The base 16 can move and rotate relative to the bridging component 17' via assembly of the guiding slot structure 38 and the rotary mechanism 26. The guiding component 24 includes a moving portion 40 and the pin 42. An end of the pin 42 is connected to the moving portion 40. The pin 42 is a hollow structure with rectangular appearance wherethrough a signal transmission cable pierces. Two ends of the signal transmission cable are electrically connected to the display module 12 and the input module 14, respectively. The moving portion 40 can be a roller mechanism, a gear mechanism or any mobile mechanism. For example, as the moving portion 40 is the roller mechanism, a roller of the moving portion 40 rolls on a flat inner wall of the guiding slot structure 38, and the guiding component 24 linearly moves relative to the guiding slot structure 38 via the moving portion 40. As the moving portion 40 is the gear mechanism, a gear of the moving portion 40 is rotatably engaged with a rack inside the guiding slot structure 38. The guiding component 24 moves relative to the guiding slot structure 38 in parallel by rotation of the gear.

In the second embodiment of the present invention, the pin 42 of the guiding component 24 equals the rectangular structure illustrated in the first embodiment. The base 16 cannot rotate relative to the bridging component 17' when the pin 42 moves inside the guiding slot structure 38. Until the pin 42 moves to the end of the guiding slot structure 38 to engage inside the rectangular engaging slot 29 on the rotating component 28, the guiding component 24 can utilize the rotary mechanism 26 to rotate the base 16 relative to the bridging component 17'. However, the pin 42 further can be designed to rotate at any position inside the guiding slot structure 38 in another embodiment of the present invention, which means the rotary mechanism 26 is not limited to the above-mentioned application and depends on actual demand.

Figure 13:
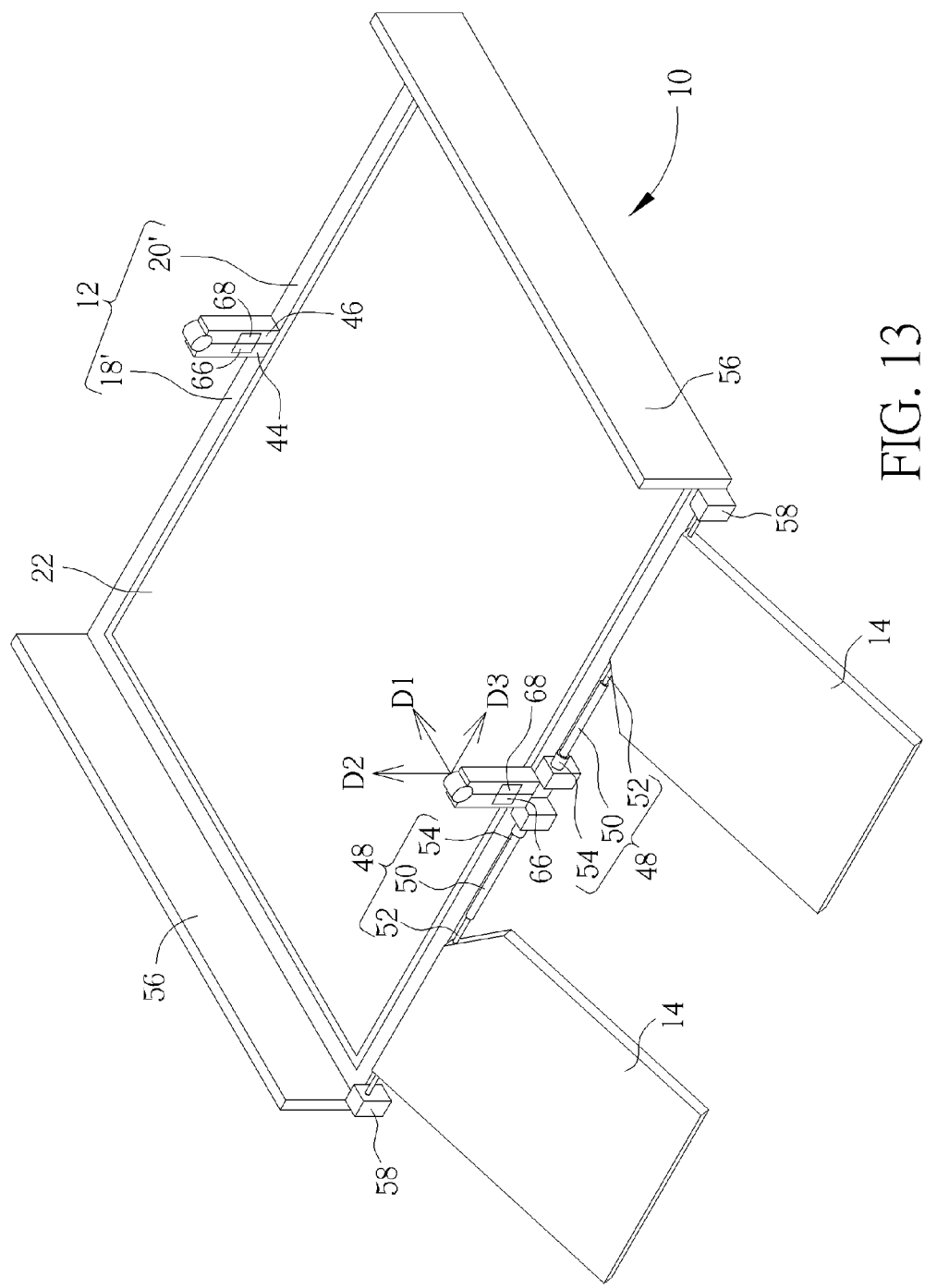
FIG. 13 and FIG. 14 respectively are diagrams of the electronic device in different modes according to a third embodiment of the present invention.
Figure 14:
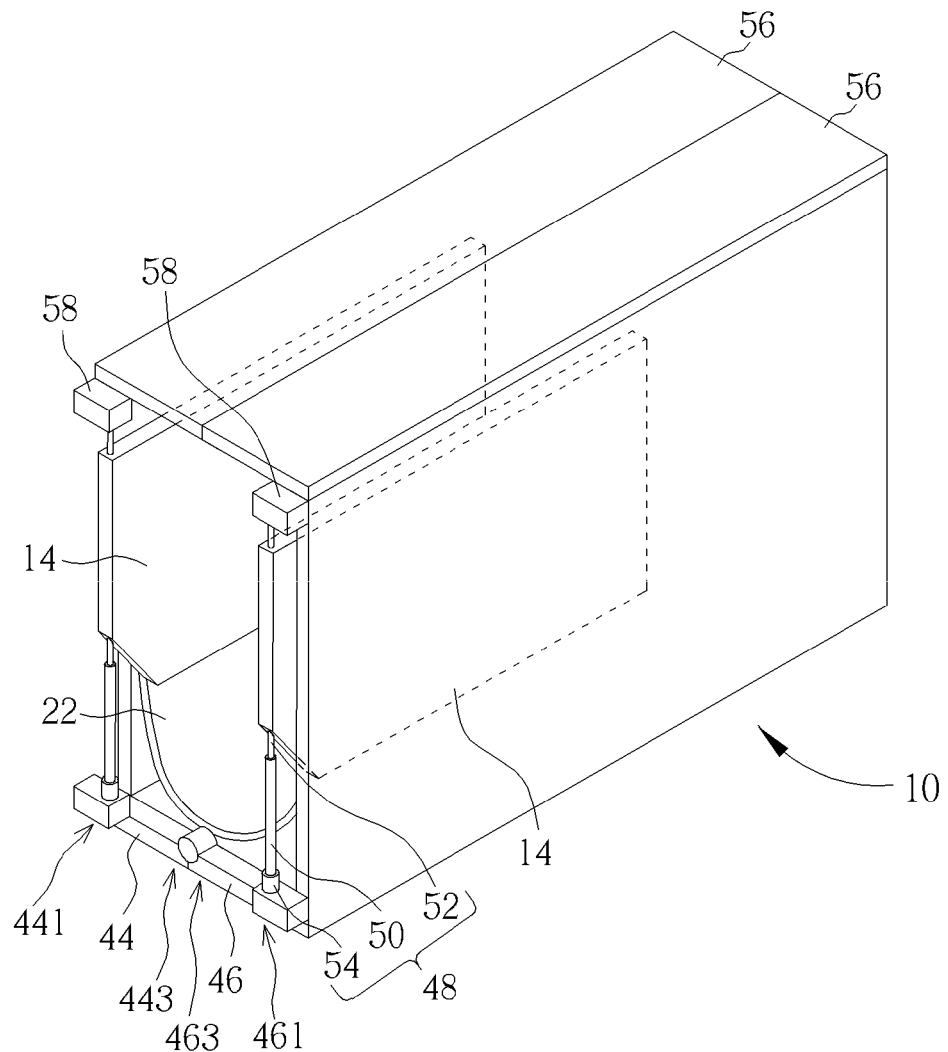

Please refer to FIG. 13 and FIG. 14. FIG. 13 and FIG. 14 respectively are diagrams of the electronic device 10 in different modes according to a third embodiment of the present invention. In the third embodiment, elements having the same numerals as one of the above-mentioned embodiments have the same structures and functions, and the detailed description is omitted herein for simplicity. Difference between the third embodiment and the above-mentioned embodiments is: a first protruding portion 44 stretches from the first connecting component 18', and a second protruding portion 46 stretches from the second connecting component 20'. An end 441 of the first protruding portion 44 is connected to the first connecting component 18', an end 461 of the second protruding portion 46 is connected to the second connecting component 20', and the other end 443 of the first protruding portion 44 pivots to the other end 463 of the second protruding portion 46. It is to say, the display module 12 of the third embodiment has no base, the first connecting component 18' is rotatably connected to the second connecting component 20' via the protruding portions 44, 46.

The electronic device 10 further includes a joint module 48 disposed between the display module 12 and the input module 14. An amount of the input module 14 can be one or more. As shown in FIG. 13, the display module 12 is in the unfold mode by the protruding portions 44, 46, and the input module 14 is in the operation mode by the joint module 48. As shown in FIG. 14, the display module 12 and the input module 14 are respectively in the fold mode and the storage mode.

The joint module 48 at least includes a revolving component 50, which provides a torque to constrain relative rotation between the input module 14 and the display module 12. The revolving component 50 utilizes a friction gasket (or any other unit) to generate the torque when the input module 14 is engaged with the revolving component 50, so as to adjust the rotary angle of the input module 14, which axially rotates relative to the display module 12 at the third direction D3. Further, the joint module 48 selectively includes an axle component 52 and a sensor 54. The revolving component 50 is disposed on an end of the axle component 52, and the sensor 54 is disposed on a position of the revolving component 50 opposite to the axle component 52. The input module 14 is movably disposed on the axle component 52, and the input module 14 can linearly move relative to the display module 12 along the axle component 52 (at the third direction D3). The sensor 54 is actuated to establish electric connection between the input module 14 and the display module 12 when the input module 14 contacts the sensor 54 (or the sensor 54 is actuated by movement of the input module 14). As the input module 14 does not move to a predetermined position (for example, the input module 14 does not contact the sensor 54), the input module 14 is locked and unable to control the display module 12.

When the display module 12 is in the fold mode, the input module 14, which is in the storage mode, can be located between the first connecting component 18' and the second connecting component 20', or located out of the first connecting component 18' and the second connecting component 20'. As shown in FIG. 13 and FIG. 14, the display module 12 further can include a contacting component 56 and an actuating component 58. The contacting component 56 is disposed on a lateral side of the first connecting component 18' or the second connecting component 20'. An amount of the contacting component 56 can be one or more. The contacting component 56 can be disposed on different lateral sides of the connecting component 18', 20'. The actuating component 58 is electrically connected to the contacting component 56 and the input module 14. The actuating component 58 may drive the contacting component 56 to generate structural deformation when the input module 14 is in the storage mode, and the contacting component 56 can contact between the first connecting component 18' and the second connecting component 20'.

The actuating component 58 may minimize the contacting component 56 or store the contacting component 56 into the first connecting component 18' (or the second connecting component 20') when the input module 14 is in the operation mode. Therefore, the contacting component 56 is a buffer to prevent the folded flexible displaying panel 22 from damage by accident impact.

The display module 12 further includes a first magnet 66 and a second magnet 68 respectively disposed on the first protruding portion 44 and the second protruding portion 46 in a magnetic repulsion manner. The first magnet 66 may be adjacent to the second magnet 68. As shown in FIG. 13, the N-pole of the first magnet 66 faces the N-pole of the second magnet 68, or the S-pole of the first magnet 66 faces the S-pole of the second magnet 68 to generate magnetic repulsive force.

Figure 15:
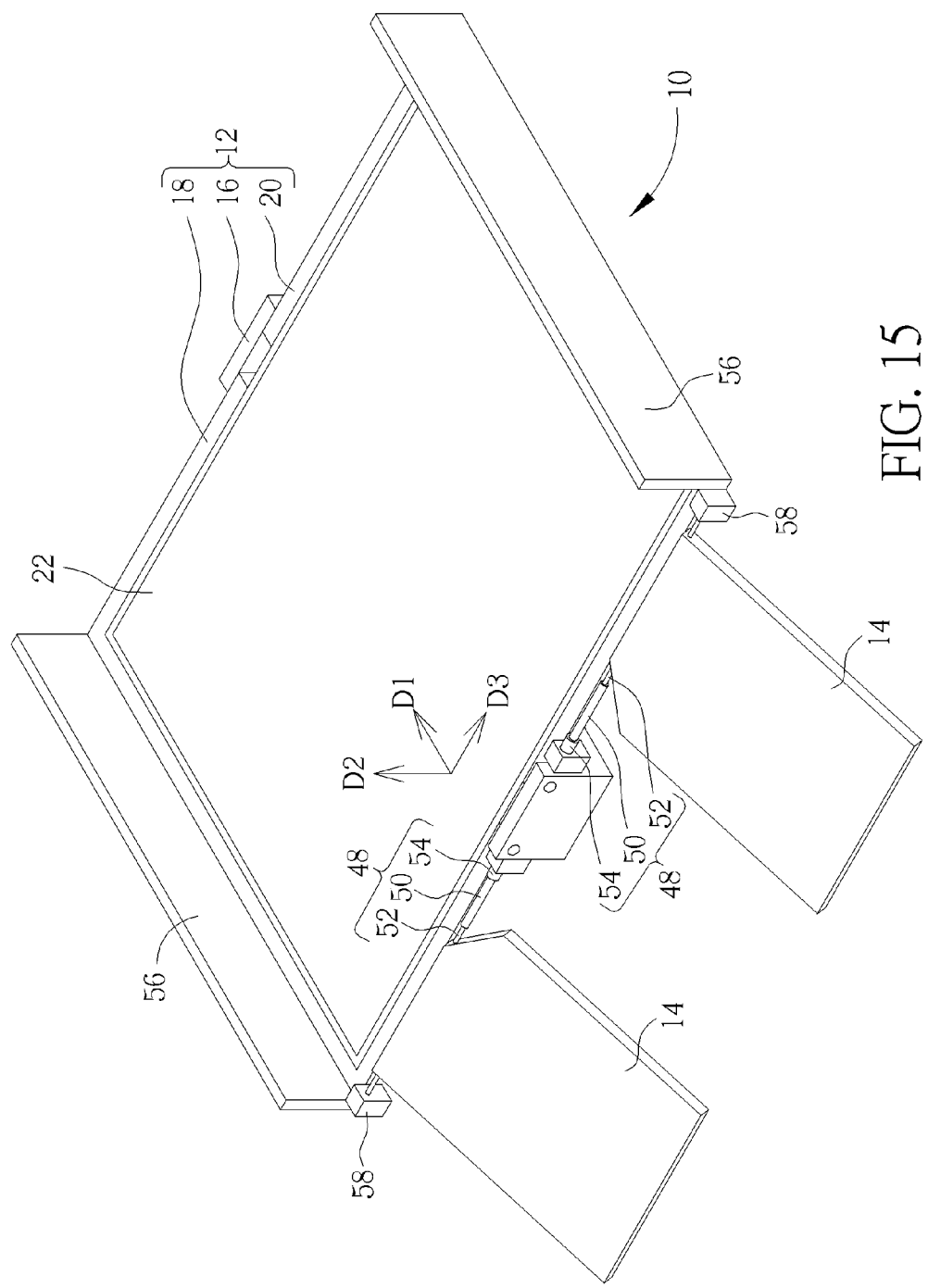
FIG. 15 is a diagram of the electronic device according to a fourth embodiment of the present invention.

Please refer to FIG. 15. FIG. 15 is a diagram of the electronic device 10 according to a fourth embodiment of the present invention. In the fourth embodiment, elements having the same numerals as one of the above-mentioned embodiments have the same structures and functions, and the detailed description is omitted herein for simplicity. The fourth embodiment utilizes the joint module 48 to rotatably dispose the input module 14 by a side of the display module 12. An axial movement of the input module 14 and the rotary angle of the input module 14 relative to the flexible displaying panel 22 are adjusted by the revolving component 50, the axle component 52 and the sensor 54 of the joint module 48. The electronic device 10 can selectively dispose the contacting component 56 and the actuating component 58 on a surface of the flexible displaying panel 22. The contacting component 56 can be moved and deformed by the actuating component 58 to prevent the flexible displaying panel 22 from damage when the flexible displaying panel 22 is bent to be the U-shaped form.

Figure 16:
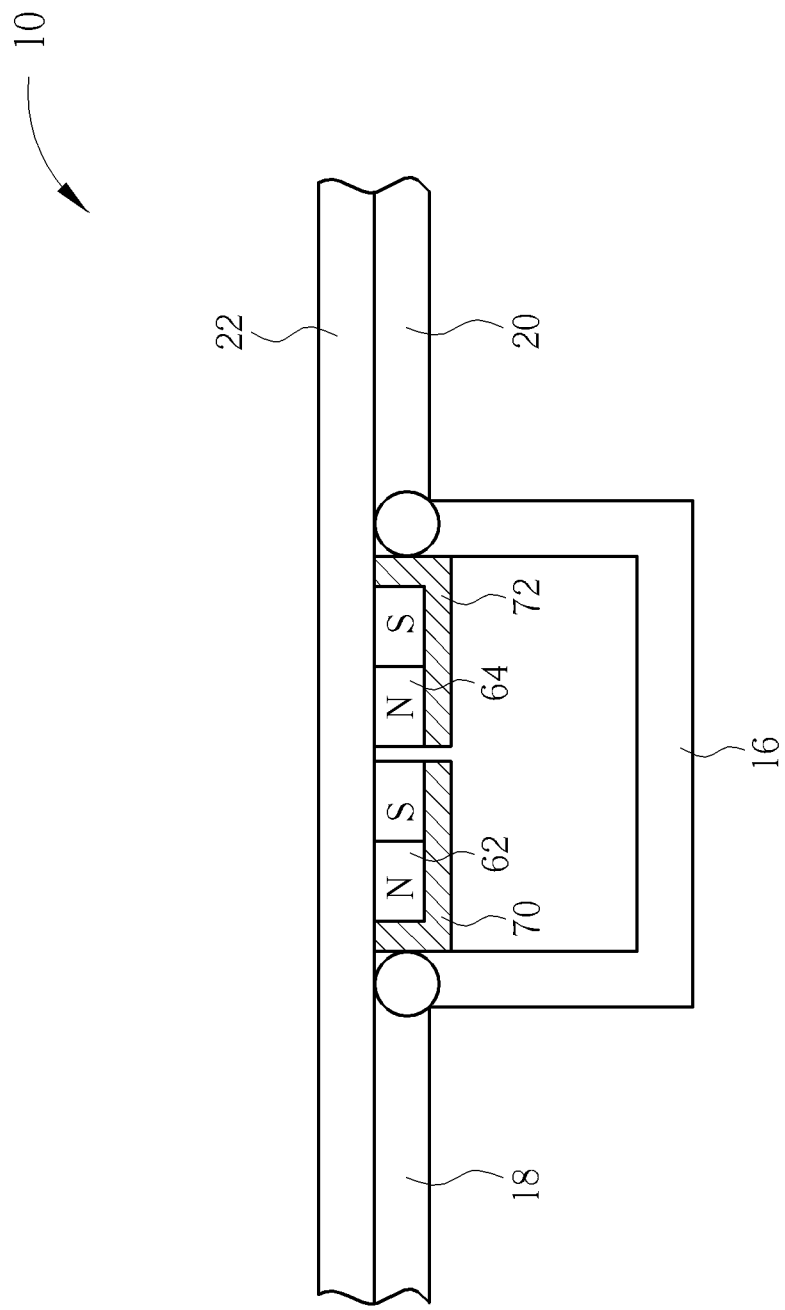
FIG. 16 is a partial structural diagram of the electronic device according to another embodiment of the present invention.

Please refer to FIG. 16. FIG. 16 is a partial structural diagram of the electronic device 10 according to another embodiment of the present invention. A first magnetic component 62 is disposed on an end of the first connecting component 18 adjacent to the second connecting component 20. A second magnetic component 64 is disposed on an end of the second connecting component 20 adjacent to the first connecting component 18. The magnetic components 62, 64 are respectively disposed on the corresponding connecting components 18, 20. The first magnetic component 62 aligns with the second magnetic component 64 in a magnetic attraction manner when the display module 12 is in the unfold mode, which means the N-pole (or the S-pole) of the first magnetic component 62 faces the S-pole (or the N-pole) of the second magnetic component 64.

The first magnetic component 62 and the second magnetic component 64 utilize magnetic attractive force to apply upward supporting force to the flexible displaying panel 22. A part of the flexible displaying panel 22 is suspended over the base 16 and is not held by the first connecting component 18 and the second connecting component 20. The present invention utilizes assembly of the first magnetic component 62 and the second magnetic component 64 to provide preferred support to the suspended part of the flexible displaying panel 22 in order to prevent the flexible displaying panel 22 from being flatly unfolded during the unfold mode. The first magnetic component 62 can be assembled with the second magnetic component 64 by a direct-contact manner or a non-contact manner, which depends on design's demand. Assembly of the first magnetic component 62 and the second magnetic component 64 can be applied to any embodiment as mentioned above.

Furthermore, a first supporter 70 and a second supporter 72 can be selectively disposed under the first magnetic component 62 and the second magnetic component 64. The supporters 70, 72 can be L-shaped structures or any structure capable of preventing the magnetic component and the connecting component from separation.

In conclusion, the electronic device of the present invention provides the preferred level support to the flexible displaying panel, and the flexible displaying panel can show flat surface when the display module is in the unfold mode. In addition, the electronic device utilizes rotary axles at the first direction, the second direction and the third direction to switch the display module between the fold mode and the unfold mode, and to switch the input module between the storage mode and the operation mode. The input module and the display module of the present invention can be stacked up to minimize configuration of the electronic device. Comparing to the prior art, the present invention has advantages of preferred level support and convenient storage function, modes of the display module and the input module can be arbitrarily switched according to user's demand.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device with a fold mode and an unfold mode, the electronic device comprising:
   a display module, comprising:
      a first connecting component;
      a second connecting component connected to the first connecting component, the second connecting component being adapted to axially rotate at a first direction so as to switch the display module to the fold mode or the unfold mode;
      a flexible displaying panel, two opposite sides of the flexible displaying panel being respectively disposed on the first connecting component and the second connecting component, the flexible displaying panel being bent to be a U-shaped form when the display module is in the fold mode, the flexible displaying panel being flat and a planar normal vector of the flexible displaying panel pointing toward a second direction when the display module is in the unfold mode, the second direction being substantially perpendicular to the first direction;
      a bridging component; and
      a base movably disposed on the bridging component, the first connecting component and the second connecting component being respectively pivoted to opposite sides of the base; and
   an input module rotatably connected to the display module and capable of axially rotating at a third direction, the third direction being substantially perpendicular to the first direction and the second direction.

2. The electronic device of claim 1, wherein the base is rotatably disposed on the bridging component and capable of axially rotating at the second direction, the input module pivots to a bottom of the bridging component opposite to the base.

3. The electronic device of claim 1, wherein the base is rotatably and movably disposed on the bridging component, the input module pivots to a top of the bridging component adjacent to the base.

4. The electronic device of claim 1, wherein the display module further comprise a guiding component disposed on a bottom of the base, the bridging component comprises a rotary mechanism, the rotary mechanism comprises a rotating component and a constraining component, the rotating component is rotatably disposed on an inner side of the constraining component, and the guiding component is detachably connected to the rotating component.

5. The electronic device of claim 4, wherein an engaging slot is formed on the rotating component, the guiding component is engaged with the engaging slot.

6. The electronic device of claim 4, wherein the bridging component further comprises a guiding slot structure, the rotary mechanism is disposed on an end of the guiding slot structure, the guiding component is slidably disposed inside the guiding slot structure.

7. The electronic device of claim 6, wherein the guiding component comprises a moving portion and a pin, an end of the pin is connected to the moving portion.

8. The electronic device of claim 7, wherein the pin is a hollow structure wherethrough a signal transmission cable pierces, the guiding component utilizes the moving portion to move relative to the guiding slot structure.

9. The electronic device of claim 7, wherein the moving portion is a roller mechanism or a gear mechanism.

10. The electronic device of claim 4, wherein the rotary mechanism further comprises at least one resilient component disposed on the rotating component, the resilient component drives a first wedging portion of the rotating component to wedge with a second wedging portion of the constraining component.

11. The electronic device of claim 4, wherein the rotary mechanism further comprises at least one resilient component disposed on the constraining component, the resilient component drives a second wedging portion of the constraining component to wedge with a first wedging portion of the rotating component.

12. The electronic device of claim 1, wherein the input module comprises a body and an input unit, the input unit is rotatably connected to the body, and the body is utilized to accommodate at least one electronic component.

13. The electronic device of claim 12, wherein the input module rotates relative to the display module to switch to a storage mode or an operation mode, the input unit faces a displaying surface of the display module when the input module is in the storage mode, the input unit moves away from the displaying surface to be parallel to the display module when the input module is in the operation mode.

14. The electronic device of claim 1, wherein a first protruding portion stretches from the first connecting component, a second protruding portion stretches from the second connecting component, an end of the first protruding portion is connected to the first connecting component, an end of the second protruding portion is connected to the second connecting component, and the other end of the first protruding portion pivots to the other end of the second protruding portion.

15. The electronic device of claim 14, further comprising:
a joint module disposed between the display module and the input module, the joint module comprising a revolving component engaged with the input module to rotate the input module relative to the display module at the third direction.

16. The electronic device of claim 15, wherein the joint module further comprises an axle component, the revolving component is disposed on an end of the axle component, the input module is movably disposed on the axle component to move relative to the display module along an axial direction of the axle component.

17. The electronic device of claim 15, wherein the joint module further comprises a sensor disposed on the revolving component, the sensor is actuated by the input module to establish electric connection between the input module and the display module.

18. The electronic device of claim 14, wherein the display module further comprises a first magnet and a second magnet respectively disposed on the first protruding portion and the second protruding portion in a magnetic repulsion manner.

19. The electronic device of claim 1, wherein the display module further comprises a contacting component disposed on the first connecting component, the contacting component contacts against the first connecting component and the second connecting component when the display module is in the fold mode.

20. The electronic device of claim 19, wherein the display module further comprises an actuating component electrically connected to the contacting component and the input module, the actuating component moves the contacting component relative to the first connecting component according to rotation of the input module.

21. The electronic device of claim 1, wherein a first magnetic component is disposed on an end of the first connecting component adjacent to the second connecting component, a second magnetic component is disposed on an end of the second connecting component adjacent to the first connecting component, the first magnetic component aligns with the second magnetic component in a magnetic attraction manner when the display module is in the unfold mode.

22. An electronic device with a fold mode and an unfold mode, the electronic device comprising:
a display module, comprising:
a first connecting component;
a second connecting component connected to the first connecting component, the second connecting component being adapted to axially rotate at a first direction so as to switch the display module to the fold mode or the unfold mode; and
a flexible displaying panel, two opposite sides of the flexible displaying panel being respectively disposed on the first connecting component and the second connecting component, the flexible displaying panel being bent to be a U-shaped form when the display module is in the fold mode, the flexible displaying panel being flat and a planar normal vector of the flexible displaying panel pointing toward a second direction when the display module is in the unfold mode, the second direction being substantially perpendicular to the first direction; and
an input module rotatably connected to the display module and capable of axially rotating at a third direction, the third direction being substantially perpendicular to the first direction and the second direction, wherein a first protruding portion stretches from the first connecting component, a second protruding portion stretches from the second connecting component, an end of the first protruding portion is connected to the first connecting component, an end of the second protruding portion is connected to the second connecting component, and the other end of the first protruding portion pivots to the other end of the second protruding portion.

23. The electronic device of claim 22, further comprising:
a joint module disposed between the display module and the input module, the joint module comprising a revolving component engaged with the input module to rotate the input module relative to the display module at the third direction.

\* \* \* \* \*